April 21, 1970     O. W. SEPP     3,507,467
SKIRT EXPANDER
Filed Aug. 7, 1968     2 Sheets-Sheet 1
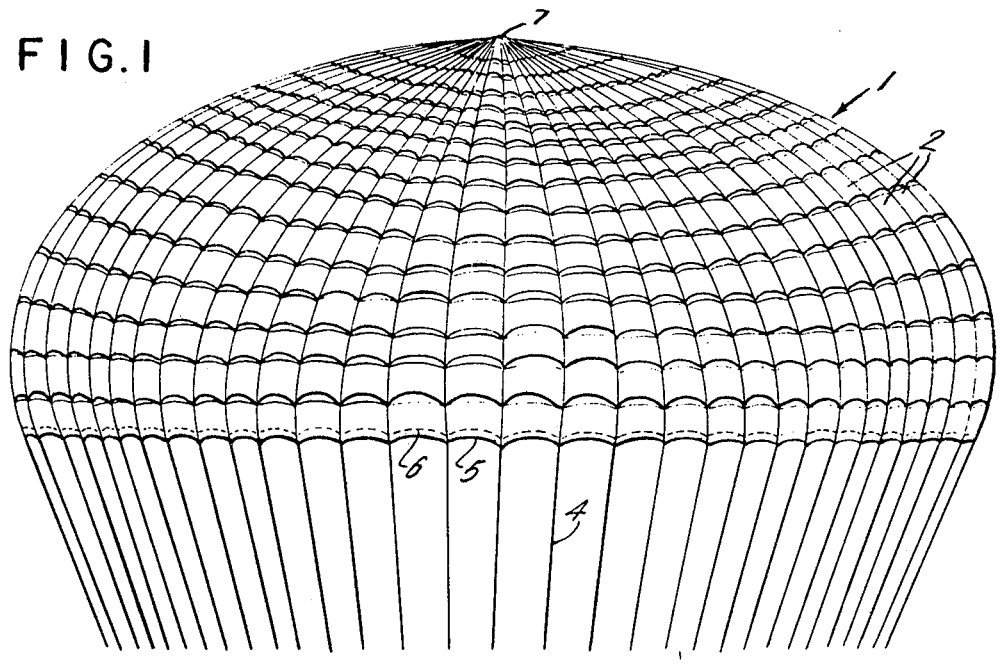
FIG.1
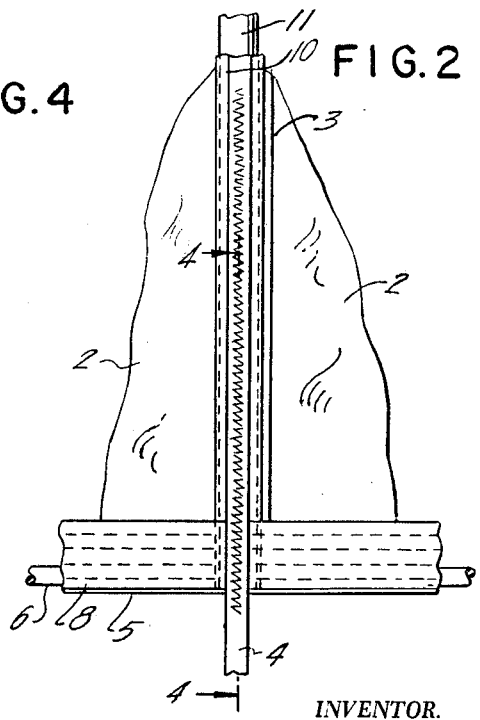
FIG.4
FIG.2
FIG.3
INVENTOR.
OSCAR W. SEPP
BY M. Robert Kesterbaum
ATTORNEY

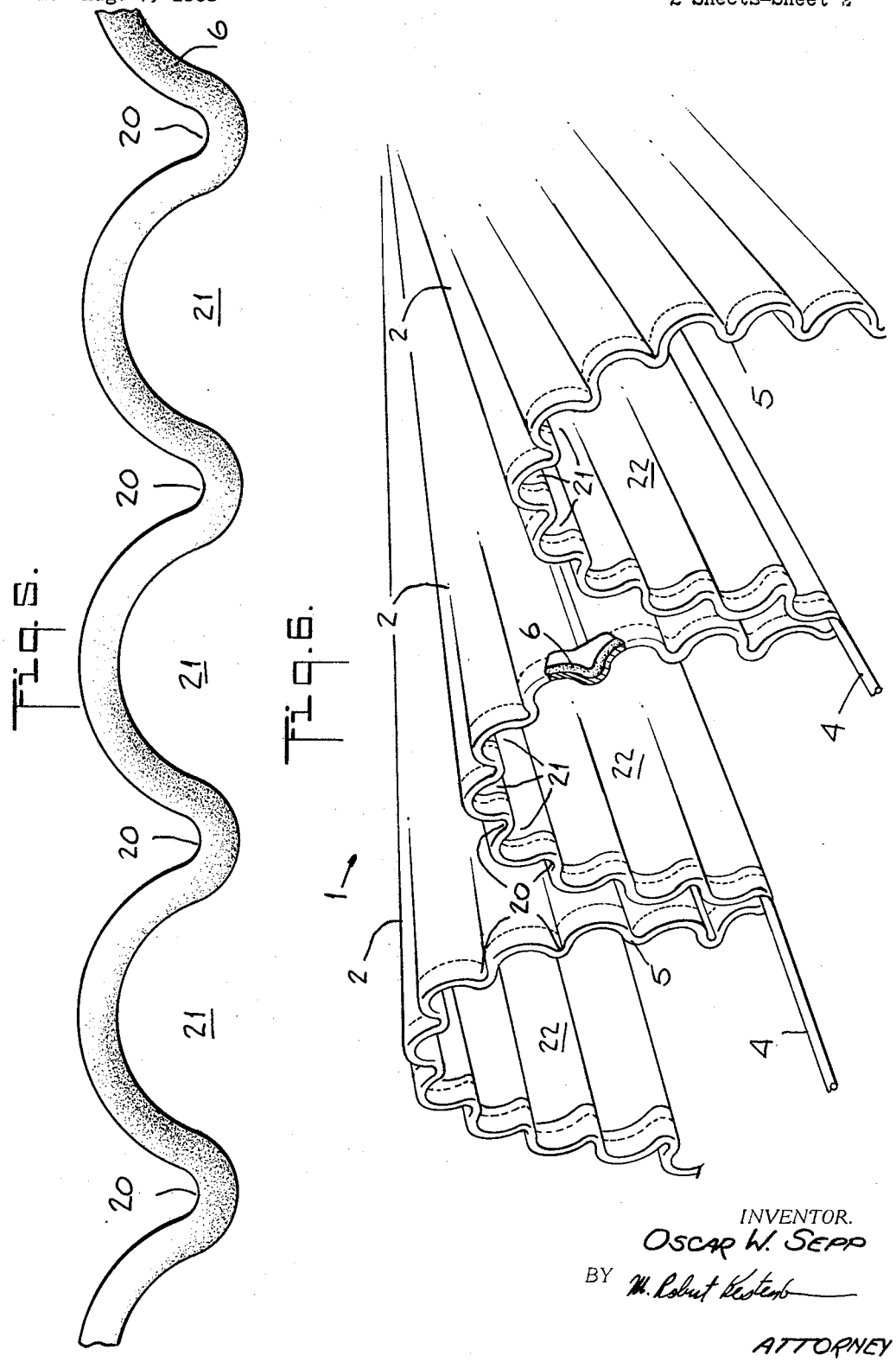

United States Patent Office 3,507,467
Patented Apr. 21, 1970

3,507,467
SKIRT EXPANDER
Oscar W. Sepp, Glen Cove, N.Y., assignor to M. Steinthal and Company, Inc., New York, N.Y., a corporation of New York
Filed Aug. 7, 1968, Ser. No. 750,942
Int. Cl. B64d 17/02
U.S. Cl. 244—145                                      12 Claims

ABSTRACT OF THE DISCLOSURE

A parachute has a resilient flexible rubber rod around and within the skirt portion. The rod has a plurality of bends spaced evenly along so as to take on a scalloped or undulated condition.

This invention relates to parachutes and more particularly to a means for providing rapid and reliable canopy opening at low speeds.

In my copending patent application Ser. No. 628,089, filed Apr. 3, 1967, now patent No. 3,429,532, I described a parachute opener or skirt expander comprised of a narrow rod of resilient and flexible material extending around and affixed to the skirt portion of a parachute canopy. The rod is packable in a plurality of folds from which it is expandable to provide positive orifices to air flow at the leading edge of the canopy.

These orifices capture the onrushing air to open the canopy mouth as quickly and fully as possible. The present invention is of the same general form and has the same general object, namely, to create the largest projected area of the canopy as possible, as soon as possible upon commencement of deployment.

However, the present invention provides improvement by enabling ultra-fast openings at low vehicle air speeds, faster than has heretofore been achieved with resilient skirt expanders.

Fast opening at low vehicle speeds is an important safety feature in parachute recovery systems, particularly ejection seat systems. At low speeds and low altitudes, the faster the canopy opens the better, and for extreme conditions, a fast opening canopy may make the difference between successful ejection and failure.

Accordingly, it is an object of this invention to provide means for fast opening of parachute canopies at low speeds.

Another object of this invention is to provide a reliable but low cost parachute skirt expander.

These objects and features of this invention will be more fully understood from the following detailed description taken in connection with the drawings in which:

FIGURE 1 is a side view of a ring sail parachute canopy which incorporates the invention.

FIGURE 2 is an enlarged view of a portion of the parachute canopy in FIGURE 1 at junction of a suspension line and the canopy skirt.

FIGURE 3 is a view of the portion shown in FIGURE 2 as seen from within the parachute canopy with a portion of tape conduit removed to show a flexible rod.

FIGURE 4 is a sectional view taken through section lines 4—4 in FIGURE 2.

FIGURE 5 is a side view of the flexible rod by itself.

FIGURE 6 is a schematic view of a portion of a canopy skirt immediately following release from its deployment bag.

Referring now to the drawings, FIGURE 1 shows the canopy, shown generally as 1, and a portion of the suspension lines 4 of a ring sail parachute. Gore panels 2 are stitched together in a radial array which converges at the vent portion 7 of the canopy. The suspension lines 4 join the canopy 1 at the canopy skirt 5. Affixed within the canopy at the skirt 5 is a flexible rod 6, the details and performance of which will be more fully described hereinafter. For purposes of describing an embodiment of the invention, a ring sail parachute has been chosen. It should be clearly understood however, that the present invention will perform equally well with any other type of parachute canopy to which the rod 6 can be affixed, such as a flat circular canopy, a hemispherical canopy, or a sky sail canopy.

In FIGURES 2, 3 and 4, the junction of suspension lines 4 and the canopy skirt 5 are shown in detail. Adjacent edges of fabric gore panels 2 are folded back, as at fold line 3, overlapped and interleaved to form 4 plies. An outer radial tape 10 and an inner radial tape 11 and a suspension line reinforcement 15 sandwich the interleaved plies of gore panels 2. Surrounding the canopy at the skirt 5 is a skirt band 8 of fabric. The suspension line 4 is stitched over the skirt band 8 and extends a distance up the radial seam. A similar construction is provided at each junction of the suspension lines 4 and the parachute skirt 5, except as the single position of the reefing line cutter (not shown). The reefing line arrangement and the method of attaching the reefing rings at the canopy skirt 5 do not form part of this invention and have been omitted in the interest of presenting a clear description.

Affixed within the canopy ot the skirt 5 is a fabric conduit 12 of thin nylon tape which is aligned opposite the skirt band 8 and extends substantially around and within the entire canopy skirt 5, except as will be described with reference to FIGURE 5. A flexible and resilient sinuous rod 6 is fitted within the conduit 12 and likewise extends around and within the entire canopy skirt 5. The rod 6 is a solid cylindrical silicone rubber rod approximately $3/16$ to $5/16$ inch in diameter.

The rod 6 and the fabric conduit 12 may be assembled separately, the fabric tape material of conduit 12 being wrapped about the rod 6 and joined to itself by a single line of stitching 14. Then the conduit 12 is laid within the skirt 5 and joined to it by another single line of stitching 13. Stitching 13 is discontinued in the area of the junction of the suspension line 4 and the skirt 5 and reinforced at that point with back stitching 18 on both sides of the junction.

Referring to FIGURE 5, approximately every 3 inches, the rod 6 has a bend 20, opening in the same direction, all along its length. As a result, the rod assumes a scalloped appearance, with a lobe 21 between each adjacent pair of bends. Typical parachute gores are 30 to 36 inches wide at the skirt, so that 10 to 12 lobes 21 will be formed between adjacent suspension lines.

The bends 20 are formed in the rod 6 by bending the rod about a mandril, heating and holding it until the bends 20 are permanently set. This may be accomplished before temperature curing in the manufacture of the rod.

Referring to FIGURE 6, the rod 6 is fixed at the skirt 5 so that the lobes 21 extend outwardly around the skirt.

Upon release of the canopy from its deployment bag, each lobe 21 creates a small positive orifice 21 to air flow at the leading edge of the canopy 1. These small orifices 21 form faster than the larger orifices 22 which are formed between adjacent suspension lines 4 by the expansion of rod 6 from its packed condition.

The small orifices 21 catch the onrushing air, contribute to quicker formation of the larger lobes 22 and cause the canopy 1 to open quickly and fully at low air speeds.

The large number of small bends 20 also provide faster canopy opening due to lobe springing. The rod 6, with the bends 20 and the lobes 21 provide more stored energy in packed condition than rods without them. The springing force or energy created at a fold when the rod is folded from its relaxed condition, is the same whether the fold is made in a small lobe 21 or in forming a large fold 22 when, in packing, each gore is folded at about its center line. Hence, the substantially greater number of lobes 21 over lobes 22 (resulting because there may be 10 or more bends 20 in each gore 2) provide more stored energy for springing the skirt apart upon release than an ordinary skirt expander without the bends 20.

Typically, the number of gores is approximately the diameter of the parachute in feet. When packed, the 28 gores in a 28-foot canopy, for example, will not allow the lobes 21 to exist in a relaxed condition. Because of the gore plurality, in the usual packing process, the skirt portions 5 of the gores 2 are pressed upon and many of the lobes 21 and the bends 20 will be squeezed, bent and folded. In this way, the normal squeezing down in the packing operation stores energy for release in the rod 6.

The chute can be packed in a conventional manner for a skirt expander and it has been found that one does not have to be too concerned with maintaining neat folds in the lobes 21. The squeezing down in the normal packing process will provide adequate bending, folding and energy store.

The specific embodiment described herein is in no way intended to be restrictive. Modfications and adaptations can be made without departing from the teachings of the invention.

What is claimed is:

1. A parachute comprising a canopy having a plurality of gores radially arranged towards a skirt portion, a plurality of suspension lines arranged about said skirt portion and joining therewith and resilient sinuous means affixed at said skirt portion close to the leading edge of said canopy, said resilient means comprising a narrow rod of flexible material having a plurality of permanently formed directional changes therein.

2. A parachute according to claim 1 wherein said rod has a plurality of pairs of adjacent permanently formed bends which pairs open in the same general direction so as to form a plurality of lobes between pairs of adjacent bends.

3. A parachute according to claim 1 wherein said rod has a plurality of permanent bends oriented to open outwardly around and within said skirt portion with lobes between pairs of adjacent bends extending outwardly around and within said skirt portion.

4. A parachute according to claim 1 wherein said rod has at least ten permanent bends per said gore.

5. A parachute according to claim 1 wherein said rod is packable in a plurality of folds and expandable from said folds to provide a plurality of relatively small orifices to air flow at the leading edge of said canopy corresponding to said permanent directional changes in said rod.

6. A parachute according to claim 5 wherein said rod is packable in a plurality of folds and expandable from said folds to provide a lesser plurality of relatively large orifices to air flow at the leading edge of said canopy corresponding to said folds.

7. A parachute according to claim 1 wherein said parachute and said rod are packable in folds in constraining means in which said permanent directional changes in said rod are moved from their relaxed state to store energy therein for expanding said rod upon release of said canopy from said constraining means.

8. A parachute according to claim 1 wherein said rod extends with a plurality of undulations around and within said canopy.

9. A parachute according to claim 8 wherein said undulations are oriented to extend outwardly around and within said canopy.

10. A parachute comprising a canopy having a skirt portion and a plurality of suspension lines radially arranged about said canopy and attached thereto, said canopy comprising a plurality of gores crossed by a plurality of radially arranged seams, a plurality of radial tapes affixed upon said seams, said suspension lines being affixed upon said radial tapes, a skirt band surrounding said canopy at said skirt portion, and a flexible resilient sinuous rod affixed around and within the mouth of said canopy directly behind said skirt band, said rod having a plurality of permanently formed directional changes therein around said skirt portion.

11. A parachute according to claim 10 wherein said directional changes are formed by a plurality of permanent bends along said rod with pairs of adjacent bends opening in the same general direction.

12. A parachute according to claim 10 wherein said directional changes comprise a plurality of generally radially arranged undulations in said rod.

References Cited

UNITED STATES PATENTS

| | | | |
|---|---|---|---|
| 2,577,047 | 12/1951 | Taylor | 244—145 |
| 3,127,137 | 3/1964 | Downing | 244—145 |

MILTON BUCHLER, Primary Examiner

J. E. PITTENGER, Assistant Examiner